(12) United States Patent
Goto et al.

(10) Patent No.: US 6,684,992 B2
(45) Date of Patent: Feb. 3, 2004

(54) ELECTRONICALLY CONTROLLABLE TORQUE TRANSMISSION DEVICE

(75) Inventors: Shiro Goto, Ann Arbor, MI (US); Russell E. Monahan, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 32 days.

(21) Appl. No.: 10/190,909

(22) Filed: Jul. 8, 2002

(65) Prior Publication Data

US 2003/0019708 A1 Jan. 30, 2003

Related U.S. Application Data

(60) Provisional application No. 60/307,780, filed on Jul. 25, 2001.

(51) Int. Cl.[7] .............................................. B60K 23/08
(52) U.S. Cl. .......................... 192/35; 192/44; 192/84.8; 192/38
(58) Field of Search .............................. 192/35, 44, 45, 192/84.31, 38, 84.8, 84.1

(56) References Cited

U.S. PATENT DOCUMENTS

| | | | | |
|---|---|---|---|---|
| 169,864 A | * | 11/1875 | Teahl ........................ | 384/565 |
| 5,653,320 A | * | 8/1997 | Vickerman .................... | 192/45 |
| 5,720,371 A | * | 2/1998 | Kimura et al. ................ | 192/44 |
| 5,924,510 A | | 7/1999 | Itoh et al. | |
| 5,927,456 A | | 7/1999 | Monahan et al. | |
| 6,135,255 A | * | 10/2000 | Myers ......................... | 192/45 |
| 6,148,978 A | * | 11/2000 | Mimura ........................ | 192/45 |

\* cited by examiner

*Primary Examiner*—Saul Rodriguez
(74) *Attorney, Agent, or Firm*—Brinks Hofer Gilson and Lione

(57) ABSTRACT

A clutch assembly comprises an outer race and an inner race defining a gap between the inner and outer races. One of the inner and outer race includes a plurality of cam surfaces, and one of the inner and outer races is tapered toward a first end of the clutch. A plurality of tapered rolling elements are positioned between the races along the cam surfaces such that the rolling elements wedge between the inner and outer races to prevent relative rotation. An axially moveable retainer interconnects the rolling elements and is biased toward the first end of the clutch, wherein each of the rolling elements wedge between the inner and outer races. An actuator selectively moves the retainer axially away from the first end such that the tapered rolling elements no longer wedge between the inner and outer races, thereby allowing relative rotational movement.

16 Claims, 3 Drawing Sheets

ELECTRONICALLY CONTROLLABLE TORQUE TRANSMISSION DEVICE

CROSS-REFERENCE TO RELATED APPLICATIONS

The present invention claims priority to U.S. Provisional Serial No. 60/307,780 filed Jul. 25, 2001, entitled "Electronically-Controllable Torque Transmission Device.

TECHNICAL FIELD OF THE INVENTION

The present invention relates generally to electronically controlled torque transmissions, particularly for locking automatic transmission stator assemblies.

BACKGROUND OF THE INVENTION

Most actuator mechanisms, such as electromagnetic coils, vacuum actuators and hydraulic devices, are typically moved axially to produce engagement. In the case of roller clutches, engagement is typically accomplished by moving the cylindrical rollers and retainer circumferentially, such as described in U.S. Pat. Nos. 5,924,510 and 5,927,456. In order to control such a traditional roller clutch through an axially-moving actuator, it is necessary to change the direction of the actuating force. Although this change in direction could be accomplished by using a cam mechanism, such a solution is generally more complicated, expensive and less reliable. It is also possible to provide this change in direction using a combination of clutches, i.e., using a typical one-way clutch and a dog clutch. However, when there is a high speed difference between the input and output, dog clutches cannot be safely engaged.

Therefore, there is a need to provide an improved torque transmission device. It would be desirable to provide a device which will allow selective engagement of a roller clutch without requiring the rolling elements of the roller clutch to be moved circumferentially.

A primary object of this invention is therefore to provide an over-running clutch mechanism, such as that disclosed in U.S. Pat. No. 5,927,456 or U.S. Pat. No. 5,924,510, which includes an actuator which can be engaged and dis-engaged through axial movement. The device can be selectively actuated by an electromagnetic trigger clutch or by hydraulic, pneumatic or other means.

BRIEF SUMMARY OF THE INVENTION

In accordance with an aspect of the present invention roller clutch utilizes a retainer that is moved axially to lock tapered rollers between cammed surfaces on the inner race and a tapered outer race. Through proper design of the cammed surfaces, a one-way or two-way clutch can be formed. Alternatively, the cammed surfaces can be formed on the ID of the outer race and the inner race can be made from a standard tapered roller bearing inner race. The invention allows selection of one of two different torque transmission modes, freewheeling or one-way (alternatively two-way) torque transmission. In order to change back and forth from the engaged and disengaged positions, the retainer is moved axially. This axial motion of the retainer can be provided by an electromagnetic coil, or alternatively a pneumatic or hydraulic actuator.

DETAILED DESCRIPTION OF THE INVENTION

The following description of the preferred embodiments of the invention is not intended to limit the scope of the invention to these preferred embodiments, but rather to enable any person skilled in the art to make and use the invention.

Figure 1:
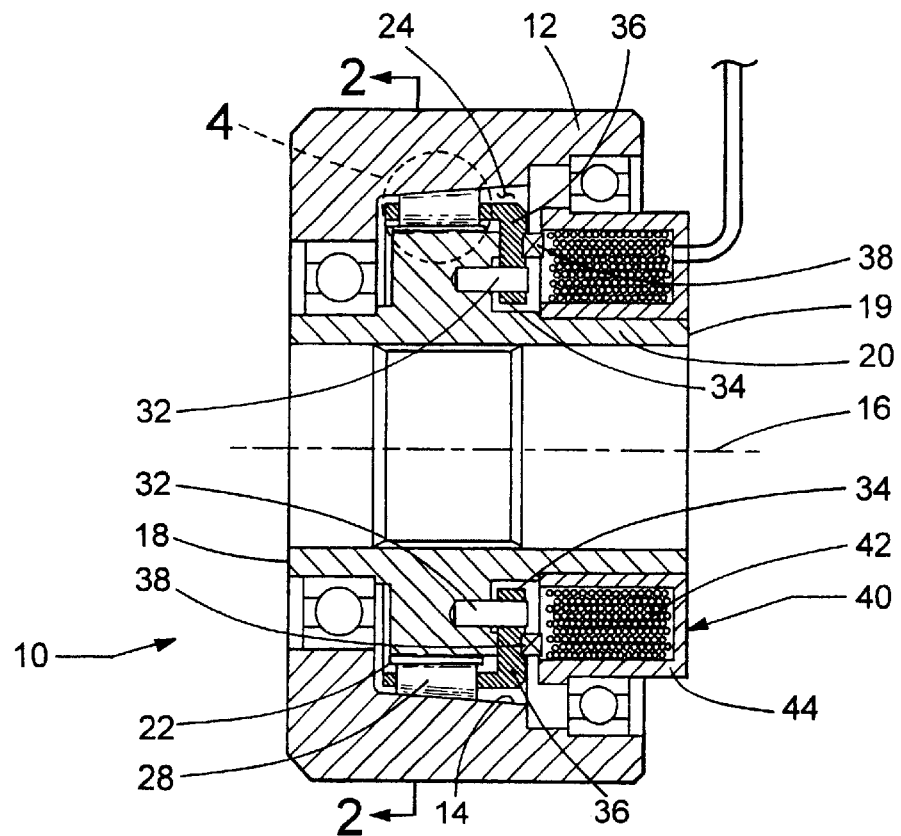
FIG. 1 is a cross-sectional view of a first preferred embodiment.
Figure 2:
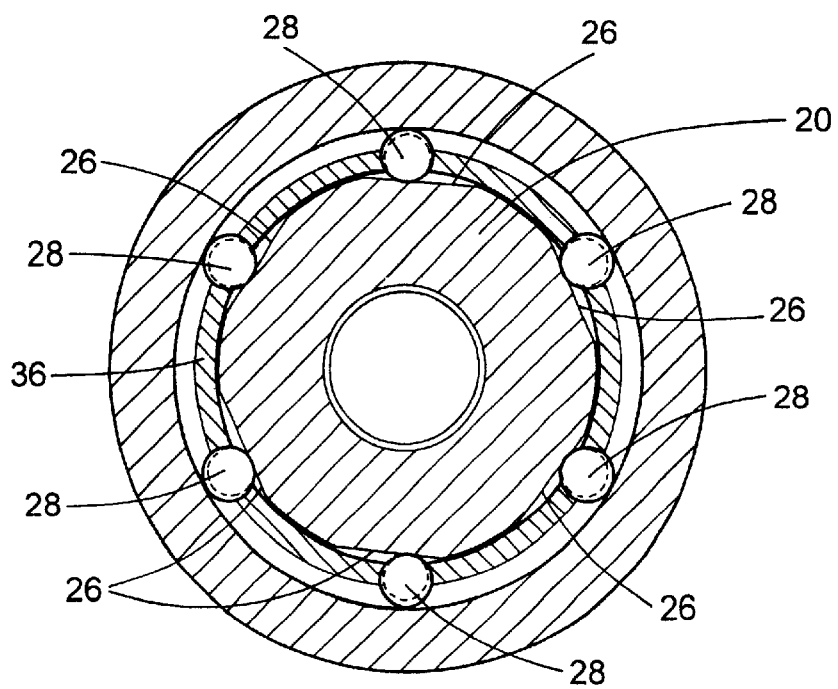
FIG. 2 is a cross-sectional view taken along line 2—2 of FIG. 1.

Referring to FIGS. 1 and 2, an over-running clutch assembly of the present invention is shown generally at 10. The clutch assembly 10 includes an outer race 12 having a cylindrical inner surface 14 which defines a central axis 16. The clutch assembly 10 also includes an inner race 20 having an outer surface 22 coaxial with the cylindrical inner surface 14 of the outer race 12. The inner surface 14 of the outer race 12 and the outer surface 22 of the inner race 20 define a gap 24 between the inner race 20 and the outer race 12. The inner race 20 is rotatable about the axis 16.

One of either the outer surface 22 of the inner race 20 or the inner surface 14 of the outer race 12 includes a plurality of cam surfaces 26 formed at spaced apart locations. Referring to FIG. 2, the outer surface 22 of the inner race 20 includes a plurality of cam surfaces 26 formed at spaced apart locations on the outer surface 22 of the inner race 20. In a first preferred embodiment, one of either the outer surface 22 of the inner race 20 or the inner surface 14 of the outer race 12 is tapered toward a first end 18 of the clutch. Referring to FIG. 1, the inner surface 14 of the outer race 12 is tapered inward toward the first end 18 of the clutch 10.

A plurality of tapered rolling elements 28 are positioned between the outer race 12 and the inner race 20 with one rolling element 28 being located along each of the cam surfaces 26 of the inner race 20. Preferably, the angle of the taper of the tapered rolling elements 28 matches the angle of the taper of the inner surface 14 of the outer race 12 such that the outer surface of the rolling elements 28 contacts each of the inner surface 14 of the outer race 12 and the outer surface 22 of the inner race 20 fully along the length of the rolling elements 28. Preferably, the rolling elements 28, the inner race 20, and the outer race 12 are made from steel. Due to the high hertzian contact stresses experienced by the rolling elements 28, the inner surface 14 of the outer race 12 and the outer surface 22 of the inner race 20 are preferably hardened and ground.

The rolling elements 28 have a diameter such that the rolling elements 28 fit within the gap 24 between the inner race 20 and the outer race 12, and the tapered rolling elements 28 engage the tapered inner surface 14 of the outer race 12 and the outer surface 22 of the inner race 20. Therefore, rotational movement of the inner and outer races 12, 20 with respect to one another will cause the rolling elements 28 to wedge between the outer surface 22 of the inner race 20 and the inner surface 14 of the outer race 12, thereby locking the inner race 20 and outer race 12 together rotationally. The cam surfaces 26 are designed such that when the rolling elements 28 wedge between the inner and outer races 12, 20 an angle is formed between the cam surfaces 26 of the inner race 20 and a line tangent to the inner surface 14 of the outer race 12.

In order for the rolling elements 28 to wedge properly between the inner surface 14 of the outer race 12 and the outer surface 22 of the inner race 20, the angle defined by the cam surfaces 26 and a line tangent to the inner surface 14 of the outer race 12 is preferably between approximately 4 degrees and approximately 10 degrees. If this angle is too small, then the hertzian contact forces will be too high, crushing the rolling elements 28 and brinnelling the surfaces 14, 22 of the inner and outer races 12, 20. If the angle is too large, the rolling elements 28 will squirt out from between the inner surface 14 of the outer race 12 and the outer surface 22 of the inner race 20. The cam surfaces 26 and the interaction of the cam surfaces 26 with the rolling elements 28 are described in detail in U.S. Pat. Nos. 5,927,456 and 5,924,510 which are both assigned to NTN Corporation and are hereby incorporated by reference into this application.

The angle of the cam surfaces 26 on the inner race 20, allow the tapered rolling elements 28 to lock between the inner and outer races 12, 20, causing the clutch 10 to engage in one direction. However, alternatively, if the cam surfaces 26 are made symmetrical about their centerlines, then a two-way clutch mechanism can be designed, whereby relative rotation of the inner race 20 and the outer race 12 in either direction will result in the clutch 10 locking.

Figure 3:
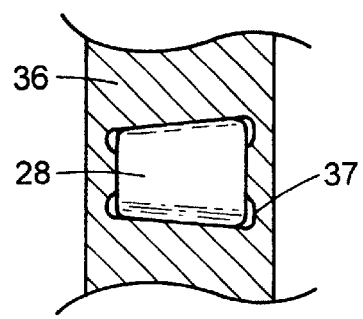
FIG. 3 is a front view of the retainer and a rolling element of the clutch of the first preferred embodiment.

Referring again to FIGS. 1 and 2, a retainer 36 interconnects all of the rolling elements 28 and causes the rolling elements 28 to axially move in unison with one another. As shown in FIG. 3, the retainer 36 includes a plurality of pockets 37 formed therein which are adapted to support the rolling elements 28. The retainer 36 is fixed circumferentially relative to the inner race 20, but is allowed to move axially. Preferably, the clutch 10 includes at least one piloting pin 32 which extends axially from the inner race 20 and slidably engages an opening 34 within the retainer 36, thereby keeping the retainer 36 from rotating relative to the inner race 20 and allowing the retainer 36 to move axially relative to the inner race 20.

Figure 4:
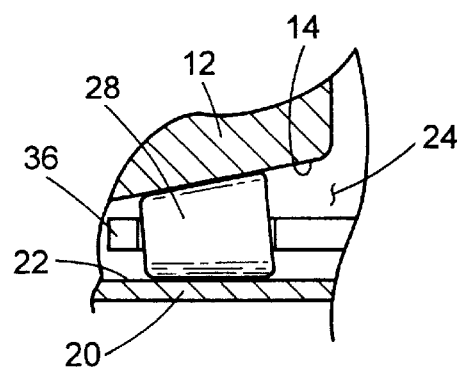
FIG. 4 is an enlarged view of the area indicated by circle 4 in FIG. 1, wherein the rolling elements are engaged with both the inner race and the outer race.
Figure 5:
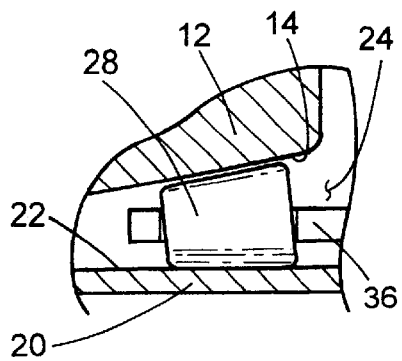
FIG. 5 is an enlarged view similar to FIG. 4 wherein the rolling elements are moved axially such that the rolling elements do not engage both the inner race and the outer race.

A first biasing element 38 acts upon the retainer 36 to force the retainer 36 toward the first end 18 of the clutch 10 and maintain engagement of the rolling elements 28 with the inner and outer races 12, 20, as shown in FIG. 4. The clutch assembly 10 includes an actuator 40 to selectively overcome the first biasing element 38 to attract the retainer 36 away from the first end 18 of the clutch 10. The retainer 36 is free to move axially with respect to the inner race 20, so when the attractive force of the actuator 40 overcomes the force of the first biasing element 38 the retainer 36 will move axially away from the first end 18 of the clutch 10 until the rolling elements 28 no longer engage both the inner surface 14 of the outer race 12 and the outer surface 22 of the inner race 20, as shown in FIG. 5.

The biasing force of the first biasing element 38 must be carefully calibrated for the clutch assembly 10. The first biasing element 38 must provide enough force to keep the retainer 36 pushed toward the first end 18 of the clutch 10, but not so much force that the actuator 40 cannot attract the retainer 36 away from the first end 18 of the clutch 10.

Because of the tapered surface of the outer race 12, the gap 24 between the inner and outer races 12, 20 becomes larger moving away from the first end 18 of the clutch 10. Axial movement of the retainer 36 with respect to the inner race 20 moves the rolling elements 28 axially along the cam surfaces 26 to a point where the gap 24 between the inner race 20 and the outer race 12 is large enough to allow relative rotational movement between the inner race 20 and the outer race 12. When the gap 24 is large enough, the rolling elements 28 cannot engage both the inner race 20 and the outer race 12, and therefore cannot wedge between the inner race 20 and the outer race 12 to lock up the clutch 10. Therefore, when the actuator 40 is activated and the retainer 36 is moved away from the first end 18 of the clutch 10, the inner race 20 and the outer race 12 are allowed to rotate relative to one another, thereby unlocking the clutch 10.

Figure 6:
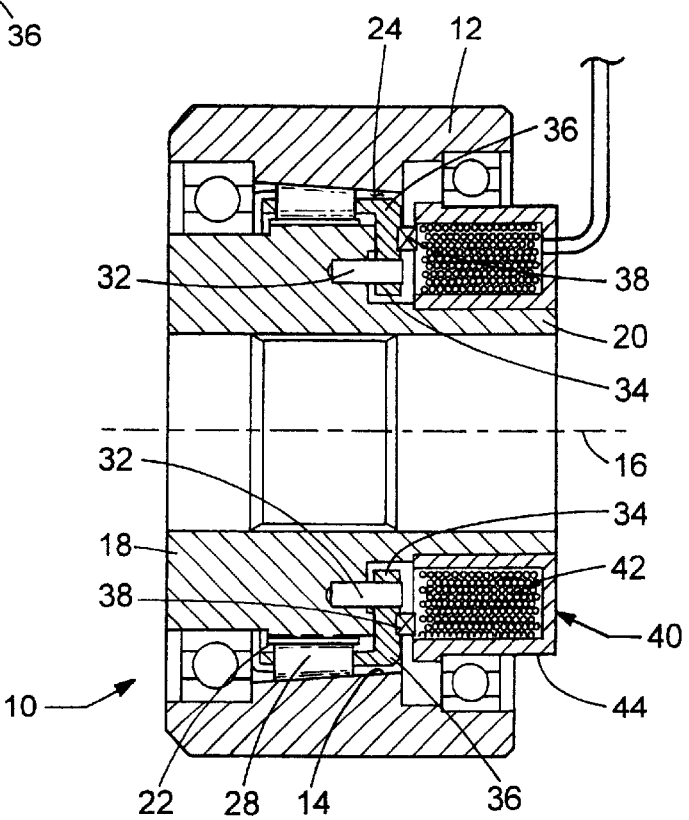
FIG. 6 is a cross-sectional view of a second preferred embodiment.

Referring to FIG. 6, a second preferred embodiment is shown at 10a, where common elements are numbered the same as the first preferred embodiment. In the second preferred embodiment, one of either the outer surface 22 of the inner race 20 or the inner surface 14 of the outer race 12 is tapered inward toward a second end 19 of the clutch 10. As shown, the inner surface 14 of the outer race 12 is tapered inward toward the second end 19 of the clutch 10.

In the second preferred embodiment, the first biasing element 38 acts upon the retainer 36 to force the retainer 36 toward the first end 18 of the clutch 10 and maintains the rolling elements 28 out of engagement with the inner surface 14 of the outer race 12 and the outer surface 22 of the inner race 20. The actuator 40 selectively overcomes the first biasing element 38 to attract the retainer 36 away from the first end 18 of the clutch 10 until the rolling elements 28 engage both the inner surface 14 of the outer race 12 and the outer surface 22 of the inner race 20 such that the rolling elements 28 wedge between the inner race 20 and the outer race 12 to lock up the clutch 10.

In a first variation of either the first or second preferred embodiments, the actuator 40 comprises an electromagnetic coil 42 mounted to either the inner race 20 or the outer race 12, such that the electromagnetic coil 42 rotates along with whichever race 20, 12 to which the electromagnetic coil 42 is mounted. Preferably, the coil 42 is housed within a housing 44 which is mounted onto one of the races 20, 12. The housing 44 and the electromagnetic coil 42 are mounted to whichever race has the cam surfaces 26 formed thereon. If the inner surface 14 of the outer race 12 includes the cammed surfaces 26, then the electromagnetic coil 42 and the housing 44 are mounted to the outer race 12. If the outer surface 22 of the inner race 20 includes the cammed surfaces 26, then the electromagnetic coil 42 and the housing 44 are mounted to the inner race 20. When energized, the electromagnetic coil 42 produces a magnetic flux which is focused on the retainer 36. When the magnetic flux passes through the retainer 36, the retainer 36 is magnetically drawn toward the actuator 40 and away from the first end 18 of the clutch 10. Once the magnetic force of the electromagnetic coil 42 overcomes the force of the first biasing element 38, the retainer 36 will start to move toward the actuator 40, thereby moving the rolling elements 28 away from the first end 18 of the clutch 10. Preferably, the first biasing element 38 is a spring that is mounted between the actuator 40 and the retainer 36 to bias the retainer 36 away from the actuator 40 and toward the first end 18 of the clutch 10.

Preferably, the retainer 36 is made from a magnetic material which will allow the magnetic flux generated by the actuator 40 to act upon the retainer 36 and magnetically attract the retainer 36. Alternatively, the retainer 36 can be made from a non-magnetic material such as plastic, wherein a magnetic plate is mounted onto the plastic retainer 36 to allow the actuator 40 to magnetically attract the retainer 36.

Figure 7:
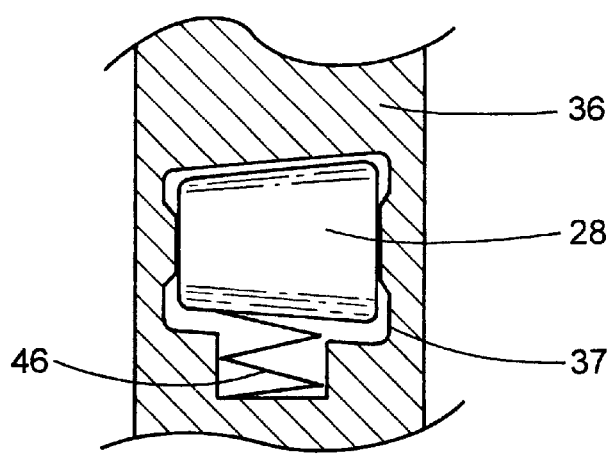
FIG. 7 is a side view of the retainer and a rolling element wherein the retainer includes a biasing element to bias the rolling element.

Referring to FIG. 7, in any of the variations of either of the preferred embodiments, the retainer 36 may include a plurality of second biasing elements 46 to preload the rolling elements 28 towards the engaged position. This allows greater tolerances for the cam surfaces 26 and the pockets 37 within the retainer 36. The second biasing elements 46 can comprise springs, rubber elements, or an equivalent biasing material. In the free position, when the energized coil 42 is attracting the retainer 36, the rolling elements 28 may occasionally contact the surfaces of the inner and outer races 20, 12. However, even in this situation, there is enough clearance between the rolling elements 28 and the inner and outer races 20, 12 to maintain the clutch 10 in the disengaged condition.

Figure 8:
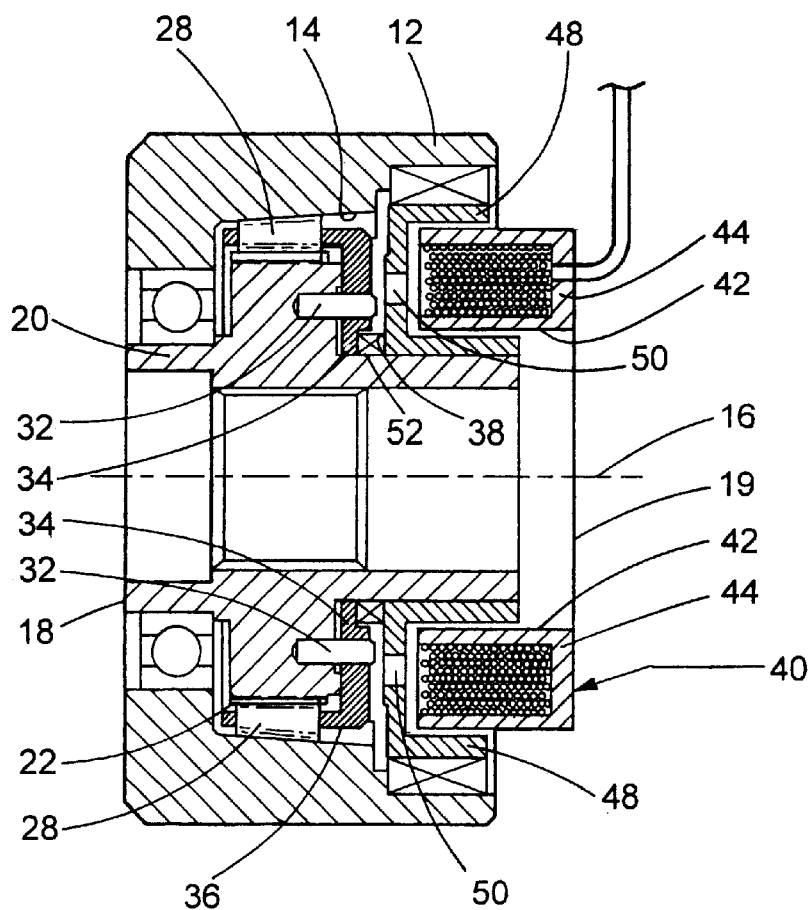
FIG. 8 is a cross-sectional view of a variation of the first preferred embodiment.

Referring to FIG. 8, a second variation of either of the first and second preferred embodiments includes a rotor 48 mounted to either the inner race 20 or the outer race 12. The rotor 48 can be mounted to either the outer race 12 or the inner race 20 depending upon which of the inner and outer race 20, 12 has the cam surfaces 26 formed therein. The rotor 48 is mounted to the race which includes the cam surfaces 26. The actuator 40 is mounted to a structural component external to the inner race 20 and the outer race 12 such the actuator 40 remains rotationally stationary while both the inner and outer races 20, 12. The rotor 48 includes a plurality of partially circumferential slots 50 extending through, and spaced radially about the rotor 48. When energized, the electromagnetic coil 42 produces a magnetic flux which is focused around the slots 50 and concentrated on the retainer 36. When the magnetic flux passes through the retainer 36, the retainer 36 is magnetically drawn toward the rotor 48. Once the magnetic force of the electromagnetic coil 42 overcomes the force of the first biasing element 38, the retainer 36 will start to move toward the rotor 48 and away from the first end 18 of the clutch 10. The first biasing element 38 of the second preferred embodiment is preferably a wave spring that is mounted between the rotor 48 and the retainer 36 to bias the retainer 36 away from the rotor 48 and toward the first end 18 of the clutch 10.

Preferably, the actuator 40 is an electromagnetic coil 42, however it is to be understood, that the present invention could be practiced with an actuator 40 of some other type. The retainer 36 could be moved through hydraulic or pneumatic means as well as through electromagnetic means.

When the actuator 40 is de-energized, the magnetic attraction of the retainer 36 toward the actuator 40 dissipates. As this attraction dissipates, the force of the first biasing element 38 quickly overcomes the dissipating magnetic attraction and forces the retainer 36 toward the first end 18 of the clutch 10. In the first preferred embodiment, when the retainer 36 and rolling elements 28 are forced toward the first end 18 of the clutch 10, the rolling elements 28 will move to a position where the gap 24 between the inner race 20 and the outer race 12 is small enough to allow the surfaces of the rolling elements 28 to engage both the inner surface 14 of the outer race 12 and the outer surface 22 of the inner race 20, whereby relative rotational movement between the inner and outer races 12, 20 will once again cause the clutch 10 to lock up. In the second preferred embodiment, when the retainer 36 and rolling elements 28 are forced toward the first end 18 of the clutch 10, the rolling elements 28 will move to a position where the gap 24 between the inner race 20 and the outer race 12 is large enough such that the surfaces of the rolling elements 28 do not engage both the inner surface 14 of the outer race 12 and the outer surface 22 of the inner race 20, thereby allowing relative rotational movement between the inner and outer races 12, 20, and unlocking the clutch 10.

In either embodiment, preferably, the retainer 36 includes an annular step 52 extending around the retainer 36. The annular step 52 faces the actuator 40 and provides a recess into which the first biasing element 38 is piloted and can collapse into when the retainer 36 is drawn toward the actuator 40. Preferably, the first biasing element 38 is a wave spring that fits within the annular step 52 on the retainer 36 and collapses within the annular step 52 when the force of the electromagnetic coil 42 exceeds the spring force of the wave spring 38.

The foregoing discussion discloses and describes two preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

What is claimed is:

1. An over-running clutch assembly comprising:

an outer race having an inner surface;

an inner race having an outer surface coaxial with said inner surface and defining a gap therebetween, said inner race being rotatable about a central axis with allowable rotational movement relative to said outer race;

one of said outer surface of said inner race and said inner surface of said outer race including a plurality of cam surfaces formed at spaced apart locations circumferentially thereabout;

one of said outer surface of said inner race and said inner surface of said outer race being tapered toward a first end of said clutch;

a plurality of tapered rolling elements positioned between said outer race and said inner race with each of said rolling elements being located along one of said cam surfaces such that said rolling elements engage and wedge between said inner and outer races to prevent relative rotation between said inner and outer races;

a retainer interconnecting all of said rolling elements and causing said rolling elements to move in unison with one another, said retainer being axially moveable relative to said inner race and said outer race along said central axis;

a biasing element which biases said retainer toward an end of said clutch;

an actuator to selectively overcome said biasing element and axially move said retainer to allow selective engagement of said clutch.

2. The over-running clutch assembly of claim 1 wherein said one of said outer surface of said inner race and said inner surface of said outer race is tapered inward toward a first end of said clutch and said biasing element biases said retainer toward said first end of said clutch to a position wherein each of said rolling elements engage and wedge between said inner and outer races to prevent relative rotation between said inner and outer races, said actuator adapted to selectively overcome said biasing element and move said retainer axially away from said first end of said clutch, thereby moving said tapered rolling elements such that said tapered rolling elements no longer engage and wedge between said inner race and said outer race, thereby allowing relative rotational movement between said inner race and said outer race.

3. The over-running clutch assembly of claim 1 wherein said one of said outer surface of said inner race and said inner surface of said outer race is tapered inward toward a second end of said clutch and said biasing element biases said retainer toward a first end of said clutch to a position wherein said tapered rolling elements do not engage and wedge between said inner race and said outer race, thereby allowing relative rotational movement between said inner race and said outer race, said actuator adapted to selectively overcome said biasing element and move said retainer axially away from said first end of said clutch, thereby moving said tapered rolling elements such that each of said rolling elements engage and wedge between said inner and outer races to prevent relative rotation between said inner and outer races.

4. The over-running clutch assembly of claim 1 wherein said actuator comprises an electromagnetic coil positioned relative to said retainer such that when said electromagnetic coil is energized a magnetic flux magnetically attracts said retainer away from said first end of said clutch toward said actuator.

5. The over-running clutch assembly of claim 4 wherein said outer surface of said inner race includes a plurality of cam surfaces formed at spaced apart locations circumferentially thereabout, and said electromagnetic coil is held within a housing that is mounted to said inner race such that the outer race can rotate relative to said electromagnetic coil and said inner race.

6. The over-running clutch assembly of claim 4 wherein said inner surface of said outer race includes a plurality of cam surfaces formed at spaced apart locations circumferentially thereabout, and said electromagnetic coil is held within a housing that is mounted to said outer race such that the inner race can rotate relative to said electromagnetic coil and said outer race.

7. The over-running clutch assembly of claim 4 further including a rotor which is mounted to one of said inner and said outer race, said electromagnetic coil being mounted independently of the inner and outer races such that said electromagnetic coil does not rotate along with either of said inner and outer races.

8. The over-running clutch assembly of claim 4 wherein said retainer is made from a magnetic material.

9. The over-running clutch assembly of claim 4 wherein said retainer is made from a non-magnetic material and includes a magnetic plate mounted thereon such that said retainer will be magnetically drawn toward said actuator when said electromagnetic coil is energized.

10. The over-running clutch assembly of claim 1 further including at least one piloting pin extending from said inner race and engaging said retainer such that said retainer is allowed to move axially relative to said inner race and is prevented from rotational movement about said central axis relative to said inner race.

11. The over-running clutch assembly of claim 1 wherein said biasing element is a spring positioned between said actuator and said retainer to bias said retainer away from said actuator and toward said first end of said clutch.

12. The over-running clutch assembly of claim 10 wherein said retainer further includes a recess wherein said recess provides a cavity into which said wave spring compresses when said retainer is attracted toward said actuator.

13. The over-running clutch assembly of claim 1 wherein said one of said outer surface of said inner race and said inner surface of said outer race is tapered at an angle such that the taper of said gap between said outer surface of said inner race and said inner surface of said outer race matches an angle of the taper on said tapered rolling elements.

14. The over-running clutch assembly of claim 1 wherein said cam surfaces are symmetrical about a centerline of said cam surfaces such that rotational movement of said inner and outer races relative to one another in any direction when said retainer is biased toward said first end of said clutch will result in said tapered rolling elements engaging and wedging between said inner race and said outer race and thereby rotationally locking said inner race and said outer race together.

15. The over-running clutch assembly of claim 1 wherein said cam surfaces are non-symmetrical about a centerline of said cam surfaces such that rotational movement of said inner and outer races relative to one another in a first direction when said retainer is biased toward said first end of said clutch is allowed and rotational movement of said inner and outer races relative to one another in a second direction, opposite said first direction, results in said tapered rolling elements engaging and wedging between said inner race and said outer race and thereby rotationally locking said inner race and said outer race together.

16. The over-running clutch assembly of claim 12 wherein said retainer includes a plurality of biasing elements mounted thereon to bias each of said tapered rolling elements in the locking direction.

\* \* \* \* \*